United States Patent [19]

Skoglund

[11] Patent Number: 4,893,649
[45] Date of Patent: Jan. 16, 1990

[54] CONSTANT FLOW RATE CONTROLLER VALVE

[76] Inventor: Paul K. Skoglund, P.O. Box 968, Woodinville, Wash. 98072

[21] Appl. No.: 251,920

[22] Filed: Sep. 30, 1988

[51] Int. Cl.$^4$ ............................................. G05D 7/01
[52] U.S. Cl. ....................................... 137/504; 251/80
[58] Field of Search .................... 137/501, 504; 251/80

[56] References Cited

U.S. PATENT DOCUMENTS

| | | | |
|---|---|---|---|
| 2,655,935 | 10/1953 | Kinzbach | 137/538 |
| 3,593,742 | 7/1971 | Taylor. | |
| 3,729,018 | 4/1973 | Butterfield | 137/501 X |
| 3,741,242 | 6/1973 | Hansen | 137/504 |
| 3,958,596 | 5/1976 | Garrard | 137/504 |
| 4,175,584 | 11/1979 | Rikuta. | |
| 4,230,147 | 10/1980 | Booth et al. | |
| 4,510,993 | 4/1985 | Luetzelschwab | 137/504 X |

OTHER PUBLICATIONS

"A Novel Approach to Flow Control for Chemical Injection and Continuous Sampling", M. S. Shelton, Society of Petroleum Engineers Publication Number 16910, pp. 329-338, Sep. 1987.

Primary Examiner—Robert G. Nilson
Attorney, Agent, or Firm—Jackson & Richardson

[57] ABSTRACT

A constant flow rate controller valve includes a piston spring biased towards the top of the valve. Fluid or gas flowing into the valve increases the pressure in the chamber above the piston, forcing the piston toward a valve seat. A pin type valve stem is thus seated in the valve seat, blocking gas or fluid flow to the outlet port. The pressure in the chamber below the piston builds until the pressure in this chamber plus the piston spring force is greater than the pressure in the chamber above the piston. The piston then lifts the valve stem from the valve seat, and the pathway to the outlet orifice is opened. Fluid or gas flows through the piston via the caibrated orifice. An equilibrium flow rate is reached by variation in the piston position based on the interaction of the above gas or fluid pressures and spring force.

8 Claims, 2 Drawing Sheets

FIG. I

CONSTANT-FLOW RATE CONTROLLER VALVE

BACKGROUND OF THE INVENTION

The present invention relates to constant gas or fluid flow regulators and more particularly to a flow regulator having a spring biased piston connected to a pin valve and being capable of maintaining a constant gas or fluid flow rate in both high pressure, low volume and low pressure, high volume environments with changes in inlet or outlet pressure. The present invention also accommodates high pressure, high volume and low pressure, low volume systems.

Constant gas or fluid flow regulators capable of accommodating low pressure, high volume fluid flow often employ sliding sleeves for opening and closing parts of the regulators. Also, multiple poppet type valves may be used for low pressure, high volume fluid flow regulation. The above prior art, however, generally cannot accommodate high pressure, low volume gas or fluid flow.

This invention, on the other hand, is able to provide constant gas or fluid flow in high or low pressure and high or low volume ranges due to the low numerical value of the ratio of the surface area of the pin valve stem to the surface area of the piston within the flow controller valve.

The present invention is also different from the above sliding sleeve and multiple poppet type valves in that the piston of the valves of the prior art move relative to the valve body to vary fluid flow as the pressure changes, while the piston of applicant's invention does not move substantially relative to the valve body after fluid flow has stabilized. Instead, constant spring force on the piston in the present invention allows constant flow with changing pressure. The present invention thus experiences less wear and tear from moving parts.

Constant fluid flow regulators taught in prior art regulate fluid flow by adjustment screws that directly vary spring tension by attachment to the piston spring itself. Other regulators change fluid flow by altering piston position via springs and ball bearings located over the piston. The system employing springs and ball bearings is subject to extreme torque due to the fluid pressure in the chamber.

The present invention, on the other hand, varies gas or fluid flow by adjustment of the valve seat position, which in turn adjusts piston spring tension. The change in spring tension thus varies the pressure differential across the piston. Torque associated with chamber fluid pressure is thus reduced.

Finally, other constant fluid flow regulators allow fluid flow around the piston periphery to constitute the principal channel of fluid passage through the regulator. In the high pressure, low flow embodiment of the present invention, the sole flow passage is a single orifice or group of orifices through the piston. This calibrated flow orifice, or orifices, allows precise measurement and calculation of prospective flow rates, unavailable in most of the prior art devices. The use of the sole flow path in one of the applicant's embodiments allows the valve to function at high pressure, unlike the prior art. Fluid flow around the piston periphery in the prior art prevents use in high pressure, low fluid environment.

SUMMARY OF THE INVENTION

The present invention provides a mechanism for automatically maintaining a uniform rate of gas or fluid flow through a flow channel under varying pressures from gas or fluid sources. In accordance with the present invention, a valve body has an inlet port and a single outlet port through the valve body. A bore is located within the valve body. A piston is disposed within the bore and is biased with a spring or springs. The piston divides the bore into two channels. The flow path through the valve mechanism is a calibrated flow orifice or orifices. The piston is connected to a pin type valve stem by a spring. The pin type valve stem seals with a seat.

The piston is initially spring biased towards the top portion of the valve. Fluid or gas flowing into the controller valve via the inlet port increases the pressure in the chamber above the piston, forcing the piston toward the valve seat. The pin type valve stem is thus seated in the valve seat, blocking gas or fluid flow to the outlet port. The pressure in the chamber below the piston builds until the pressure in this lower chamber plus the piston spring force is greater than the pressure in the chamber above the piston. The piston then lifts the valve stem from the valve seat, and the pathway to the outlet orifice is opened. Fluid or gas flows through the piston via the calibrated orifice. An equilibrium flow rate is reached (i.e., when the pressure in the upper chamber equals the pressure in the lower chamber plus the spring force) by variation in the piston position based on the interaction of the above gas or fluid pressures and spring force.

After the desired flow rate has been attained, the piston no longer moves substantially relative to the valve body. Instead, constant flow rate is maintained despite pressure changes because the spring force maintains a constant pressure differential between the two valve chambers.

DESCRIPTION OF THE DRAWINGS

A more complete appreciation of the invention may be had by reference to the accompanying drawing illustrating a preferred embodiment of the invention to be described in detail, wherein.

DESCRIPTION OF THE PREFERRED EMBODIMENT

The novel features believed to be characteristic of this invention are set forth in the appended claims. The invention itself, however, may best be understood and its various objects and advantages best appreciated by reference to the detailed description below in connection with the accompanying drawings.

Figure 1:
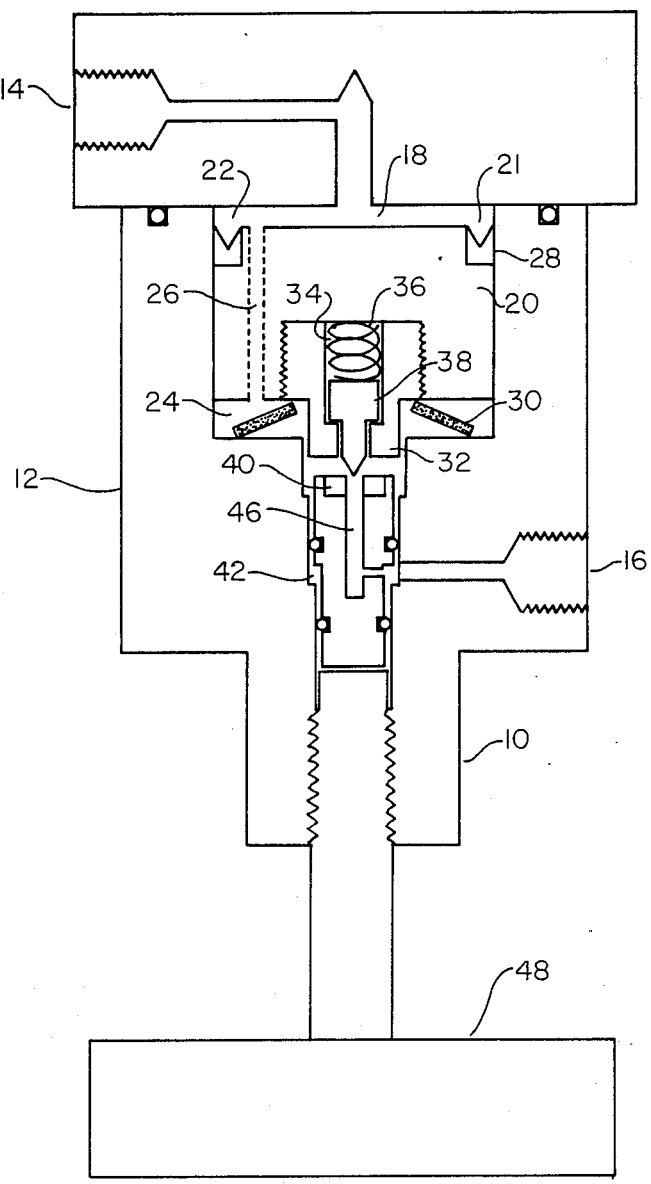
FIG. 1 is a cross-sectional view of a valve mechanism in accordance with the present invention.

Referring to FIG. 1, the reference numeral 10 indicates the constant flow rate controller valve, as a whole. Valve 10 has a valve body 12 having at its top portion an inlet port 14, and having at its bottom portion an outlet port 16. A bore 18 is formed within valve body 12; the bore 18 is defined by an elongated cylinder of decreased diameter at its lower portion.

A piston 20 having a head 21 is disposed within bore 18 such that a portion of bore 18 is divided into chamber 22 above piston head 21 and chamber 24 below piston 20. Piston 20 is of a generally cylindrical configuration. Chambers 22 and 24 are sized to be of relatively small area to minimize the amount of "fluid packing" in the invention. "Fluid packing" relates to the amount of fluid in the valve. If less flow is present in the valve, fluid compressability will not delay the response time of the valve to presure fluctuations.

When applicant's device is used in a high pressure, low volume environment (e.g., 5000 p.s.i. and 0.5 gallons per day), the sole flow path through the constant flow rate controller valve 10 is an axial flow path through the piston 20. No other paths are present, such as fluid flow around the periphery of piston 20, thus allowing the invention to operate in high pressure, low flow environments. However, for use in a low pressure, high flow environment (e.g. 20 p.s.i. and 100 gallons per day), fluid flow around the periphery of piston 20 may occur. This axial flow path within piston 20 is an orifice 26 that permits the flow of fluid or gas from chamber 22 through piston 20 and into chamber 24. However, orifice 26 need not pass through piston 20, but may connect chamber 22 and 24 by passing through valve housing 12 instead.

In order to prevent fluid or gas flow around the periphery of piston 20 when this invention is employed in high gas or fluid pressure environments, seal 28 is placed around the periphery of piston 20. Seal 28 is preferably a cup seal. Seal 28 is optional when the invention is used in a low pressure environment. When used in a low pressure environment, seal 28 may be a diaphragm seal.

Within chamber 24 are springs 30 which contact piston 20 and bias piston 20 upwardly toward chamber 22. Springs 30 may specifically be Bellville washer type springs, manufactured by Key Bellville, Inc., Box 1916, Leechburg, Pa. 15656, may be another washer type spring, or may be another type of spring, such as a coil type spring for example. By employing washer type springs for springs 30, the desired flow rate may be conveniently altered by stacking additional washer type springs to vary the spring force present in chamber 24 of the constant flow rate controller valve 10, thus changing the pressure differential across the piston.

Piston shaft 32 is a relatively narrowed cylindrical structure located on the bottom portion of piston 20. Internal piston chamber 34 is a bore of a first relatively narrow diameter within piston shaft 32, and of a second relatively broader diameter within piston 20. Located within internal piston chamber 34 is spring 36. Also located within internal piston chamber 34 is a pin valve having a pin valve stem 38, which is biased downward by spring 36 such that the bottom end of pin valve stem 38 protrudes from internal piston chamber 34 and piston shaft 32. Pin valve stem 38 is shaped and sized to complement the above stated varied diameter of internal piston chamber 34. Note that other,. types and shapes of valve plugs besides a pin valve may be employed provided that the surface area of the valve plug is substantially less than the surface area of the piston (e.g., 0.03 inches in plug diameter compared to 1.5 inches in piston diameter) so that the valve 10 can function independently from the flow pressure at the outlet port 16, as described below. For example, a ball-type valve plug may also be employed. The bottom end of pin valve stem 38 has a small surface area, and is conical in shape to incrementally vary the flow rate of the fluid exiting chamber 24 to achieve the desired initial flow rate, as detailed more fully below.

The bore 18 forming chamber 22 and 24 is sized such that the diameter of bore 18 below chamber 24 is substantially narrower than the portions of bore 18 forming chambers 22 and 24. This narrowed portion of bore 18, exit channel 42, is sized to accomodate piston shaft 32 as piston 20 is forced toward exit channel 42 when the fluid or gas pressure in chamber 22 is greater than the fluid or gas pressure and the spring force in chamber 24.

Sized to fit within exit channel 42 is pin valve seat 40, which is also sized to seat pin valve stem 38. Note that if pin valve stem 38 seats in pin valve seat 40 with excessive force, spring 36 prevents structural damage by absorbing this excessive force. Fluid path 46 is an axial flow path within pin valve seat 40, which accomodates gas or fluid flow from chamber 24 to outlet port 16 when pin valve stem 38 is not seated in pin valve seat 40. Fluid path 46 is of a substantially narrower diameter than exit channel 42 to minimize "fluid packing," as discussed above.

Gas or fluid flow rate may be varied by adjustment of adjustment screw 48, which contacts the bottom portion of pin valve seat 40 and varies the position of pin valve seat 40 within exit channel 42. The force exerted by springs 30 may thus be increased or decreased because the change in position of pin valve seat 40 changes the distance piston 20 must travel to seat pin valve stem 38 in pin valve seat 40. In this manner, the change in spring tension of spring 30 varies the spring force on piston 20, thus varying the pressure differential between chamber 22 and chamber 24. Adjustment screw 48 is machined to allow maximum to minimum flow rate within one 360 degree turn of adjustment screw 4.

The constant flow rate controller valve 10 operates based on the following force balance equations:

$$P_1 \cdot A_{piston} = (P_2 \cdot A_{piston}) + KX + (A_{pin} \cdot P_{out})$$

Where
$P_1$ = pressure in chamber 22
$A_{piston}$ = surface area of piston 20
$P_2$ = pressure in chamber 24
$KX$ = spring force of springs 30
$A_{pin}$ = surface area of pin valve stem 38 which mates with seat 40
$P_{out}$ = pressure at outlet port 16

Rearrangement of terms produces the equation $$P_1 - P_2 / A_{piston} = KX + (A_{pin} \cdot P_{out})$$

Because $A_{pin}$ is negligible in comparison to $A_{piston}$, and assuming $P_2$ equals the flow pressure at outlet port 16, the following equation characterizes the force balance existing in the present invention.

$$P_1 - P_2 / A_{piston} = KX$$

Thus, the differential pressure ($P_1 - P_2$) is a function of spring force (KX).

The flow rate of water, for example, through the constant flow rate controller valve 10 is defined by the following equation:

$$q = 20 \cdot (P_1 - P_2)/R$$

Where
q = flow rate
$P_1$ = pressure in chamber 22
$P_2$ = pressure in chamber 24
R = flow resistance across orifice 26

Note that because differential pressures ($P_1 - P_2$) is a function of spring force (KX), flow rate (q) is also a function of spring force. Thus, the constant flow rate controller valve 10 has a constant flow as long as spring force remains constant. This flow is constant regardless of the flow pressure at inlet port 14. Theoretically, there is a pressure force exerted on the pin valve stem 38 and against the piston 20 defined by $$P_{out} \cdot A_{pin}$$

Where
$P_{out}$ = pressure at outlet port 16
$A_{pin}$ surface area of pin valve stem 38, However, the above force is negligible due to the small surface area of pin valve stem 38 when compared to the surface area of piston 20. Thus, flow rate is constant regardless of the flow pressure at outlet port 16. Note that this force would not be negligible and the flow rate would not be constant if, in the present invention, the area of the pin valve stem 38 was not small in value when compared to the surface area of piston 20.

The constant flow rate controller valve 10 operates as follows. Gas or fluid passes though inlet port 14 and enters chamber 22. Piston 20, which is biased by springs 30 towards chamber 22, is pushed toward chamber 24 by the increased pressure in chamber 22, thus seating pin valve stem 38 in pin valve seat 40. The seating of pin valve stem 38 in pin valve seat 40 blocks flow to flow path 46 and outlet port 16. Chamber 24 is thus sealed.

Gas or fluid flows from chamber 22 into chamber 24 via orifice 26, and the flow pressure in chamber 24 increases.

When the flow pressure in chamber 24 plus the spring force of spring 30 exceeds the pressure in chamber 22, piston 20 is pushed towards chamber 22 and pin valve stem 38 is unseated from pin valve seat 40. A piston equilibrium position is next attained when the flow pressure in chamber 22 equals the flow presure in chamber 24 plus the spring force of spring 30.

The above piston equilibrium position also provides the desired flow rate. Without further substantial change in the position of piston 20, the flow rate will remain constant despite flow pressure changes because the spring force of springs 30 maintains a constant pressure differential between chamber 22 and chamber 24.

Figure 2:
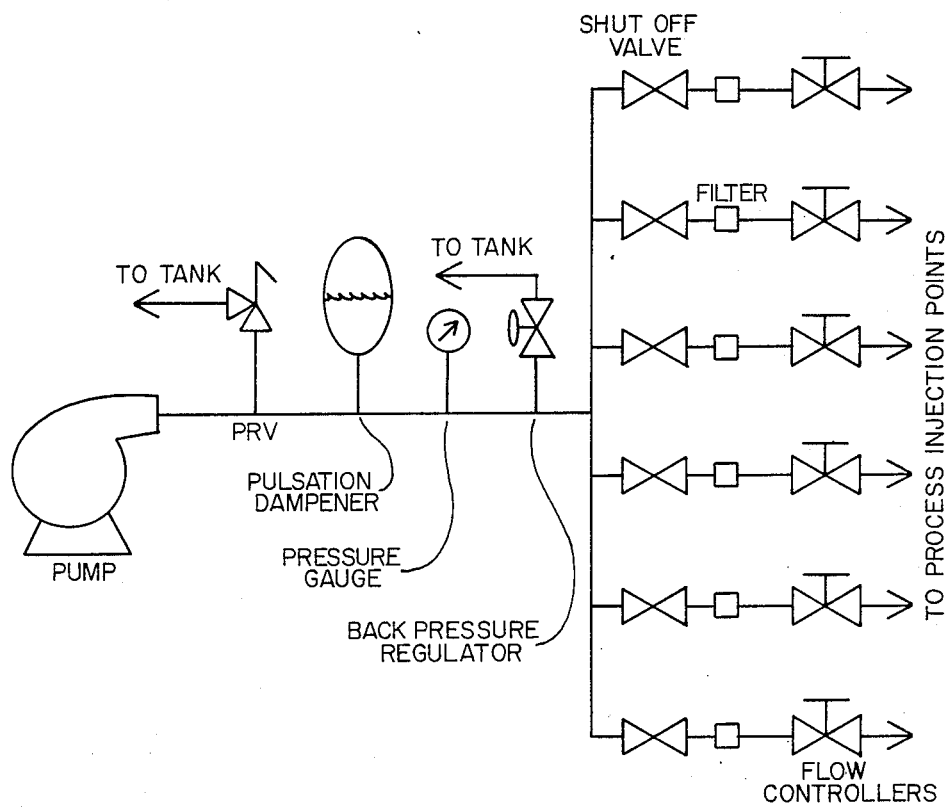
FIG. 2 is a schematic view of the valve mechanism as used in an exemplary injection system.

Referring to FIG. 2, an exemplary injection system employing applicant's constant flow rate controller valve 10 is shown. This injection system may be, for example, a food production system in which minute quantities of vitamins, flavorings, colorings, additives, preservatives or the like must be added to a food product flow path at a constant rate in a high pressure, low volume environment.

Specifically, a single metering pump services a multi-location injection system with numerous injection points. On a single line from the pump, a variety of informational and/or regulational devices may be placed, such as a pulsation damper, pressure gauge and a back pressure regulator. This single line is then split into a series of process injection lines, each of which services a particular process injection point. Attached to each of these individual process injection lines is a shut off valve, a filter and applicant's constant rate flow controller valve 10. The number of valves 10 that may be employed in the system of FIG. 2 is limited by the pump strength. Note that no additional energy source is required for operation of applicant's constant rate flow controller valve 10. Valve 10 operates solely on the differential pressure between the inlet 14 and outlet 16, as shown in FIG. 1.

While particular embodiments of the present invention have been described in some detail above, changes and modifications may be made in the illustrated embodiments without departings from the form or spirit of the invention. It is therefore intended that follwing claims cover all equivalent modifications and variations as fall within the scope of the invention as defined by the claims.

I claim:

1. A valve mechanism for regulating gas or fluid flow comprising:
   a housing having an inlet and outlet forming a flow passage through said housing;
   a piston mounted in a bore formed in said flow passage, said piston intersecting said flow passage, said piston dividing a portion of said flow passage into first and second chambers located at opposite sides of said piston and respectively communicating with said inlet and outlet;
   an orifice through said piston, said orifice connecting said first and second chambers, said orifice calibrated for a predetermined flow rate and being the sole gas or fluid flow passage from said inlet to said outlet;
   a valve stem connected with said piston for movement therewith by a first spring means, said valve stem having a small surface area in relation to the surface area of said piston;
   a valve seat between said piston and said outlet, said valve seat aligned to seat and unseat said valve stem based on the relative position of said piston within said housing;
   a second spring means biasing said piston toward said inlet, said spring means providing a bias force that establishes a substantially constant pressure differential between said first chamber and said second chamber to enable a substantially constant outlet flow at varied pressures without substantial movement of said piston after flow is initiated; and,
   a screw adjustment means in contact with said valve seat, said valve seat being variable in position within said housing based upon adjustment of said screw adjustment means.

2. A valve mechanism for regulating gas or fluid flow comprising:
   a housing having an inlet and an outlet forming a flow passage through said housing;
   a piston mounted in a bore formed in said flow passage, said piston intersecting said flow passage, said piston dividing a portion of said flow passage into first and second chambers, said chambers located at opposite sides of said piston and respectively communicating with said inlet and outlet;
   orifice means providing a calibrated rate of gas or fluid flow between said first and second chambers;
   a valve stem connected to said piston by a first spring means, said valve stem having a surface area which is small in relation to the surface area of said piston;
   a valve seat between said piston and said outlet, said valve seat aligned to seat and unseat said valve stem based on the position of said piston relative to said housing;
   -a second spring means biasing said piston toward said inlet, said second spring means providing a bias force that establishes a substantially constant pressure differential between said first chamber and said second chamber such that a substantially constant flow is produced at said outlet without substantial movement of said piston and without substantial additional movement of said valve stem relative to said valve seat after flow is initiated, whereby the flow rate remains substantially constant at varied pressures; and means for varying the flow rate by adjusting said bias force exerted by said second spring means by varying the position of said valve seat in order to adjust the flow rate.

3. The valve mechanism of claim 2 wherein said orifice is the sole gas or fluid flow passage from said inlet to said outlet.

4. The valve mechanism of claim 3 further comprising sealing means between said piston and said housing to prevent flow peripheral to said piston.

5. The valve mechanism of claim 2 wherein said second spring means is a washer type spring.

6. The valve mechanism of claim 2 wherein said means for adjusting said force exerted by said second spring means is a screw in contact with said valve seat.

7. A valve mechanism for regulating gas or fluid flow comprising:

a housing having an inlet and outlet forming a flow passage through said housing;

a piston mounted in a bore formed in said flow passage, said piston intersecting said flow passage, said piston dividing a portion of said flow passage into first and second chambers, said chambers located at opposite sides of said piston and respectively communicating with said inlet and outlet;

an orifice through said piston, said orifice connecting said first and second chambers, said orifice calibrated for a predetermined flow rate and being the sole gas or fluid flow passage from said inlet to said outlet;

a valve stem connected with said piston by a first spring means, said valve stem having a small surface area in relation to the surface area of said piston;

a valve seat between said piston and said outlet, said valve seat aligned to seat and unseat said valve stem based on the relative position of said piston within said housing;

a second spring means biasing said piston toward said inlet; and, a screw adjustment means in contact with said valve seat, said valve seat being variable in position within said housing based upon adjustment of said screw adjustment means.

8. A valve mechanism for regulating gas or fluid flow comprising:

a housing having an inlet and an outlet forming a flow passage through said housing;

a piston mounted in a bore formed in said flow passage, said piston intersecting said flow passage, said piston dividing a portion of said flow passage into first and second chambers located at opposite sides of said piston and respectively communicating with said inlet and outlet;

orifice means providing a calibrated rate of gas or fluid flow between said first and second chambers;

a pressure regulating valve disposed within said flow passage between said piston and said outlet, controllable by said piston, and including a valve plug and valve seat;

a first spring means connecting said piston to said valve plug; and a second spring means biasing said piston only toward said inlet, said second spring means cooperating with said piston and pressure regulating valve to establish a substantially constant pressure differential between said first chamber and said second chamber such that a substantially constant flow is produced at said outlet without substantial movement of said piston after flow is initiated.

means for varying the flow rate by adjusting the bias force exerted by said second spring means by varying the position of said valve seat in order to adjust the flow rate.

* * * * *